US011153331B2

(12) United States Patent
Zou et al.

(10) Patent No.: US 11,153,331 B2
(45) Date of Patent: Oct. 19, 2021

(54) DETECTION OF AN ONGOING DATA BREACH BASED ON RELATIONSHIPS AMONG MULTIPLE NETWORK ELEMENTS

(71) Applicant: Holonet Security, Inc., Sunnyvale, CA (US)

(72) Inventors: Feng Zou, San Jose, CA (US); Chunqing Cheng, San Jose, CA (US); Sheng Li, Beijing (CN)

(73) Assignee: HeFei HoloNet Security Technology Co.. Ltd., AnHui (CN)

( * ) Notice: Subject to any disclaimer, the term of this patent is extended or adjusted under 35 U.S.C. 154(b) by 556 days.

(21) Appl. No.: 15/960,830

(22) Filed: Apr. 24, 2018

(65) Prior Publication Data

US 2018/0309775 A1    Oct. 25, 2018

Related U.S. Application Data (60) Provisional application No. 62/489,338, filed on Apr. 24, 2017.

(51) Int. Cl.
| | | |
|---|---|---|
| *H04L 29/06* | (2006.01) | |
| *H04W 12/02* | (2009.01) | |
| *H04L 29/08* | (2006.01) | |

(52) U.S. Cl.
CPC .......... *H04L 63/1416* (2013.01); *H04L 63/04* (2013.01); *H04L 63/1425* (2013.01); *H04W 12/02* (2013.01); *H04L 67/10* (2013.01)

(58) Field of Classification Search
CPC . H04L 63/1416; H04L 63/04; H04L 63/1425; H04L 67/10; H04W 12/02
See application file for complete search history.

(56) References Cited

U.S. PATENT DOCUMENTS

| | | | | |
|---|---|---|---|---|
| 9,798,883 | B1 * | 10/2017 | Gil | H04L 63/1416 |
| 9,900,330 | B1 * | 2/2018 | Dargude | H04L 63/20 |
| 2013/0091539 | A1 * | 4/2013 | Khurana | H04L 63/1425 726/1 |
| 2017/0126724 | A1 * | 5/2017 | Zhong | G06F 13/00 |
| 2017/0171215 | A1 * | 6/2017 | Brucker | G06F 9/468 |
| 2017/0302505 | A1 * | 10/2017 | Zafer | H04L 69/40 |
| 2018/0183766 | A1 * | 6/2018 | Crabtree | H04L 9/3239 |
| 2018/0248902 | A1 * | 8/2018 | Danila-Dumitrescu | G06N 3/02 |
| 2018/0278647 | A1 * | 9/2018 | Gabaev | H04L 63/1466 |
| 2020/0012784 | A1 * | 1/2020 | Orihara | G06F 21/554 |
| 2020/0273040 | A1 * | 8/2020 | Novick | G06Q 20/4016 |

* cited by examiner

*Primary Examiner* — Catherine Thiaw
(74) *Attorney, Agent, or Firm* — Perkins Coie LLP (57) ABSTRACT

The disclosed teachings include a computer-implemented method a computer-implemented method for identifying a data breach. The method includes monitoring movement of data over a computer network in real-time or near real-time relative to at least one of a user, a device, or a software application, comparing the monitored movement of the data to a baseline movement of the data over the computer network in real-time or near real-time relative to at least one of the user, the device, or the software application, and identifying an ongoing data breach in real-time or near real-time based on the comparison. The identified ongoing data breach indicates a relationship between the data and at least one of the user, the device, and the software application.

14 Claims, 5 Drawing Sheets

DETECTION OF AN ONGOING DATA BREACH BASED ON RELATIONSHIPS AMONG MULTIPLE NETWORK ELEMENTS

CROSS-REFERENCE TO RELATED APPLICATION

This application claims to the benefit of U.S. Provisional Patent Application No. 62/489,338 titled "REAL-TIME DATA BREACH DETECTION BASED ON A NETWORK HOLOGRAM" and filed on Apr. 24, 2017, which is incorporated by reference herein in its entirety.

TECHNICAL FIELD

The disclosed teachings relate to computer network security. In particular, the disclosed teachings relate to techniques for real-time or near real-time detection of an ongoing data breach in a computer network.

BACKGROUND

A computer network is a communications network which allows interconnected nodes (e.g., computer devices) to share data and/or resources. The computer devices may exchange data over wired or wireless communication links. For example, an enterprise network is a common information technology (IT) infrastructure deployed today by organizations of all sizes, across the globe. An enterprise network is used to maintain and communicate sensitive data. As such, enterprise networks include security features to prevent, mitigate, or minimize data breaches. A data breach is the intentional or unintentional release of secure, private, or confidential information to an untrusted environment. Other terms for this phenomenon include unintentional information disclosure, data leak, or data spill.

More specifically, a data breach is a security incident in which sensitive, protected, or confidential data is copied, transmitted, viewed, stolen, or used by an individual unauthorized to do so. Data breaches may involve financial information such as credit card or bank details, personal health information (PHI), personally identifiable information (PII), trade secrets of corporations or intellectual property, etc. Most data breaches involve overexposure of vulnerable unstructured data such as files, documents, and sensitive information. Incidents range from a concerted attack by bad actors to careless disposal of used computer equipment or data storage media.

The risk and incidents of data being breached have increased with the proliferation of cloud computing to store or communicate sensitive, protected, or confidential data. Cloud computing is the practice of using a computer network of remote servers hosted on the Internet to store, manage, and process data, rather than using local servers or a personal computer. There has been a digital transformation because of an explosion of cloud-based applications and mobile device proliferation, which has extended traditional boundaries of computer networks and raised, in tandem, the omnipresent challenge to protect sensitive data generated by distributed or decentralized computing resources of computer networks, which are accessed and used from remote locations.

The need for improved network visibility has likewise increased to monitor activities of computer networks for security threats by detecting potential or actual risks, and then take actions to prevent or mitigate effects of such threats. Network visibility refers to the ability to readily see and/or quantify performance and activities of a computer network and associated resources. This visibility is what enables analysts to quickly identify security threats and resolve performance issues, ultimately ensuring a stable and reliable computer network. Expansive visibility and knowledge about how networked resources are being used, and by whom, and from where, has become a security mandate for enterprises to effectively protect their computing network and assets in this new, and everchanging world of cloud computing. However, existing network security tools still fail to provide reliable detection of an ongoing data breach.

SUMMARY

The disclosed embodiments include a computer-implemented method for identifying a data breach. The method includes monitoring movement of data over a computer network in real-time or near real-time relative to at least one of a user, a device, or a software application, comparing the monitored movement of the data to a baseline movement of the data over the computer network in real-time or near real-time relative to at least one of the user, the device, or the software application, and identifying an ongoing data breach in real-time or near real-time based on the comparison. The identified ongoing data breach indicates a relationship between the data and at least one of the user, the device, and the software application.

In some embodiments, monitoring the movement of data over a computer network includes obtaining an indication of a path taken by the data over the computer network such that the comparison is between the path taken by the data and a baseline path of the data over the computer network. In some embodiments, the path is between first computing devices coupled to a network, and the baseline path is between second computing devices different from the first computing devices. In some embodiments, the path is entirely within the computer network. In some embodiments, the path includes public cloud-based resource external to the computer network.

In some embodiments, monitoring the movement of data over a computer network includes ascertaining a characteristic of the data at a point in time such that the comparison is between the characteristic of the data at the point in time and a baseline characteristic of the data at a point in time. In some embodiments, the characteristic is a location or state of the data on the computer network.

In some embodiments, comparing the monitored movement of the data to a baseline movement of the data over the computer network includes detecting an anomalous movement as a monitored movement of the data that differs from an expected movement of the data as indicated in the baseline movement.

In some embodiments, identifying the ongoing data breach includes identifying a relationship between the data and any or each of the user, the device, the software application, or a physical location of the ongoing data breach.

In some embodiments, the data is sensitive data that an entity seeks to deliberately protect from disclosing to another entity. For example, the sensitive data can be any of personal health information, personally identifiable information, payment card industry data, confidential information, or source code.

In some embodiments, the data breach is sensitive, protected, or confidential data that is copied, transmitted, viewed, stolen, or used by an unauthorized individual.

In some embodiments, comparing the monitored movement of the data to a baseline movement of the data is relative to each of the device or the software application wherein the data breach is identified in real-time or near real-time.

Embodiments also include a non-transitory computer readable storage medium storing instructions that, when executed by a processor, cause a computer system to establish a baseline behavior for sensitive data by utilizing a network hologram that represents a relationship between at least one of a user, a device, a software application, or data of a computer network, detect anomalous movement of the sensitive data over the computer network in real-time or near real-time based on the baseline behavior of the sensitive data, where the sensitive data is deliberately protected from disclosure, and identify an ongoing breach of the sensitive data relative to at least one of the user, the device, or the software application based on the network hologram.

In some embodiments, a sensitive data type includes at least one of personally identifiable information, payment card industry data, protected health information data, confidential information data, source code, design document data, marketing document data, or financial document data.

In some embodiments, the computer system can be caused to detect that movement of the sensitive data is different from an expected movement of the sensitive data as described by the baseline behavior of the sensitive data.

In some embodiments, prior to establishing a baseline behavior, the computer system can generate the network hologram by collecting metadata of data moving over the computer network and identifying each of the user, the device, the software application, and the data by processing the collected metadata with an analytics engine; and ascertaining a relationship between the user, the device, the software application, and the data.

Embodiments include a computer system with a processor and a memory including instructions that, when executed by the processor, cause the computer system to monitor an element of a computer network, compare behavior of the monitored element to an expected behavior of the monitored element, and identify an ongoing data breach based on the comparison. The comparison includes a relationship between the monitored element and each of a plurality of elements of the computer network. In some embodiments, the expected behavior is described in a profile of a user, device, software application, or data.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of the concepts that are not particularly addressed herein. It should be understood that these concepts and applications fall within the scope of the accompanying claims.

The purpose of terminology used herein is only for describing embodiments and is not intended to limit the scope of the embodiments. Where context permits, words using the singular or plural form may also include the plural or singular form, respectively.

As used herein, unless specifically stated otherwise, terms such as "processing," "computing," "calculating," "determining," "displaying," "generating," or the like refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

System Overview

Figure 1:
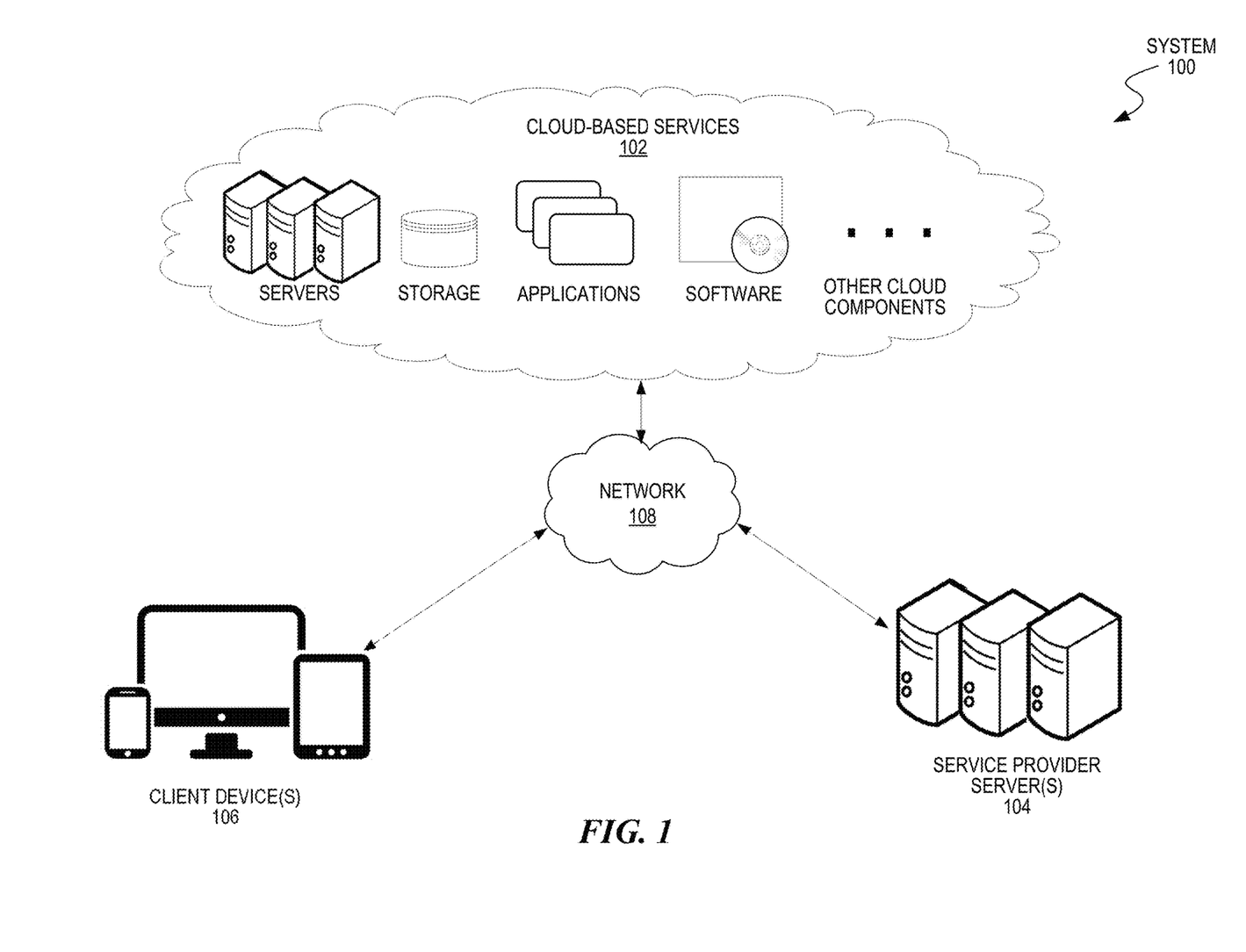
FIG. 1 is a block diagram of an example system with cloud-based services that is susceptible to a data breach and in which the disclosed technology can be implemented according to some embodiments of the present disclosure.

FIG. 1 is a block diagram of an example system with cloud-based services that is susceptible to a data breach and in which the disclosed technology can be implemented according to some embodiments of the present disclosure. The system 100 includes components such as cloud-based services 102, one or more service provider servers 104 that use the cloud-based services 102 to provide services to one or more client devices 106 (or to other service providers) that run cloud-based applications, all of which are interconnected over a network 108, such as the Internet.

Examples of the service providers administering the service provider servers 104 that use the cloud-based services 102 include financial services that store, use, or communicate sensitive data regarding credit cards or bank details, healthcare services that store, use, or communicate personal health information (PHI), or any service that stores, uses or communicates personally identifiable information (PII), trade secrets of corporations or intellectual property, etc. These types of services (or entities offering these services) are susceptible to data breach incidents that involve overexposure of vulnerable data such as files, images, documents, etc.

The network 108 may include any combination of private, public, wired, or wireless portions. Data communicated over the network 108 may be encrypted or unencrypted at various locations or at different portions of the network 108. Each component of the system 100 may include combinations of hardware and/or software to process data, perform functions, communicate over the network 108, and the like. For example, any component of the system 100 may include a processor, memory or storage, a network transceiver, a display, an operating system, and application software (e.g., for providing a network portal), and the like. Other components, hardware, and/or software of the system 100 are well known to persons skilled in the art and, as such, are not shown or further discussed herein.

The cloud-based services 102 can provide access to a shared pool of configurable computing resources including servers, storage, applications, software platforms, networks, services, and the like, accessed by the service provider servers 104 to offer applications to the client devices 106. The provider of the cloud-based services 102 supports multiple tenants and may be referred to as a platform as a service (PaaS). The PaaS can be provided to developers for creating add-on applications that run on the components of the cloud-based services 102. For example, add-on applications can provide subscription billing services to users using the client devices 106. The subscription billing services are provided by the service provider servers 104 and include applications built on a software platform offered by the cloud-based services 102. Although the system 100 illustrates resources in the context of cloud-based servicers, the disclosure is not so limited. For example, the cloud-based services 102 of the system 100 could be offered on premise in a private network or via private cloud services.

The service provider servers 104 may include any number of server computers that provide services or software applications such as subscription billing services, which allow businesses to automatically bill their customers for goods or services. The billing services may support credit card payments, usage-based billing, multiple charging methods, etc. Although shown separately from the cloud-based services 102, the service provider servers 104 may be included as part of the cloud-based services 102. The service provider servers 104 may provide or administer a user interface (e.g., website) accessible from the client devices 106. The user interface may include features such as network visibility analytics to provide insight into security threats.

Examples of client devices 106 include smartphones (e.g., APPLE IPHONE, SAMSUNG GALAXY, NOKIA LUMINA), tablet computers (e.g., APPLE IPAD, SAMSUNG NOTE, AMAZON FIRE, MICROSOFT SURFACE), computers (e.g., APPLE MACBOOK, LENOVO 440), and any other device that include a combination of hardware and/or software that enables coupling to the network 108 to access or use the cloud-based services 102 offered by the service provider servers 104.

Therefore, the system 100 offers many benefits because the service provider servers 104 can utilize the cloud-based services 102 to provide diverse, and scalable services in a cost-effective manner over the network 108 to users of the client devices 106. However, the shared and distributed nature of the system 100 is vulnerable to security threats because, for example, there are numerous possible points of attack by bad actors seeking to steal sensitive data, or sensitive data can be inadvertently shared, stored, or communicated in a manner that harms owners of that data. Existing network visibility technologies lack the ability to detect security threats of data breaches in shared and distributed systems. Instead, existing network visibility technologies are localized to detect data breaches long after they have already occurred, at which point the only course of action is to mitigate the damage caused by the data breach.

The central goal of all security measures undertaken by enterprises is to protect data. Most security incidents (e.g., data breaches) result in the misappropriation of sensitive data. Typically, external bad actors or even rogue insiders steal data or simply access data that they are not authorized to access. The misappropriation of sensitive data entails moving the sensitive data from one location to another. Hence, the challenge in today's computer networks is pinpointing data breaches through the movement of sensitive data. To that end, the disclosed embodiments include techniques for real-time or near real-time anomaly detection that is effective in a landscape of new threats resulting from the movement of data over distributed local and/or cloud-based computer networks.

In this era of cloud-based infrastructures and global collaboration, data regularly flows freely across and beyond distributed enterprise computer networks. However, sensitive data remains closely guarded and monitored because of the risk of data breaches. Even though enterprises may deploy security measures to protect computer networks, secure applications, and to detect threats, conventional solutions offer little visibility into what happens to data before, during, and after a data breach. Specifically, existing technologies cannot provide instant visibility into movements of data, especially identifying sensitive data that is being moved, by whom, from where to where, and by using what device. Nevertheless, enterprises desire the ability to detect unusual movements of sensitive data in real-time or near-real time to identify an ongoing data breach and take effective prevention and remediation measures.

Existing technologies for data breach detection are inadequate and unreliable. Specifically, existing security tools focus on two areas of detection: (i) protecting a network's perimeter from external threats and (ii) identifying abnormal or suspicious activity within a network's perimeter. For example, to aid in understanding, consider analogizing an enterprise's network to a large gilded mansion full of rich targets for thieves. Securing a perimeter of the mansion is analogous to "guarding the gates" of a network, and tracking down (i.e., identifying) unusual activity is similar to asking unfamiliar visitors to state their business. In today's more open IT environment, however, both approaches fall short.

First, a practical security technique for "guarding the gates" of a computer network's perimeter without degrading performance remains elusive. Bad actors continue to pilfer sensitive data when a computer network has been breached. Specifically, modern computer networks are highly interconnected and support the free-flow of data among the computer networks at any point in time for entirely legitimate purposes. Hence, computer networks are porous and malleable to support the free-flow of data so that service providers can maintain a level of performance expected by users. That is, securing a computer network's perimeter is impractical without compromising performance. Consequently, a network's perimeter remains a common point of attack because a bad actor needs to find only one vulnerability (e.g., a crack in the metaphorical wall of the network) to gain entry to an enterprise computer network. Despite substantial efforts and monetary investments in intrusion prevention tools, significant data breaches continue to occur at alarming rates.

Second, the problem with security tools that focus on identifying suspicious behavior internal to a computer network is that conventional breach detection yields too many false positives. For example, monitoring the activity of all or some data can lead to identifying an overabundance of anomalies that pose no threat to a computer network. Referring back to the mansion metaphor, it is challenging for security guards to distinguish between uninvited guests snooping in unauthorized locations and household attendants going about their business. Hence, the behavior that appears abnormal may be harmless. Yet security teams are hard pressed to investigate every instance of suspicious activity, only to find that most of them are false positives. Unfortunately, that is the state of most breach detection technologies today. Hence, modern measures drain both the efficiency and effectiveness of security countermeasures.

The disclosed embodiments overcome these drawbacks by providing a mechanism to detect abnormal movement of data. For the first time, enterprises are enabled to gain instant visibility into data in motion and detect ongoing abnormal movements of data in real-time or near real-time. Instead of enacting security measures that block network access to data or involve chasing down suspected bad actors after they have misappropriated data, the disclosed embodiments add an effective means of tracking data as it moves internally and/or externally over one or more networks, thus allowing security administrators to know instantly when data is being compromised.

The disclosed technology connects the movement of data in real-time or near real-time with associated users, devices, applications, etc. This solution is accomplished by leveraging machine learning and analytics to construct a complete and precise profile of each of these elements and the connections among them with respect to the flow of data. In particular, the disclosed embodiments provide instant visibility and anomaly detection for various forms of data in motion through machine learning techniques that connect users, devices, apps, data, etc. in real-time. Embodiments include a network hologram that is created based on relationships among hologram elements (e.g., users, devices, software applications, and data).

In some embodiments, a baseline measure derived from a network hologram allows for detecting an anomalous movement of data in real-time or near real-time. This reduces false positive rates by enabling security teams to focus specifically on the abnormal movement of data rather than any abnormal network or application behavior involving any type of data. With real-time or near real-time anomaly detection, the disclosed embodiments give security teams time to take necessary preventive and remedial measures to minimize losses or damage caused by an ongoing data breach.

Network Hologram

An entity (e.g., individual, organization, enterprise) that handles data could benefit from having visibility into movement of that data inside and outside of its networks or control to identify actual or potential security threats such as data breaches. For example, an entity may seek visibility into the movement of data relative to a private network. Any unusual movement of the data could be indicative of a data breach. To achieve that goal, a network hologram can provide real-time or near real-time visibility into movements of the data over one or more computer networks relative to one or more network elements (e.g., computing resources or users thereof).

A "network hologram" refers to a representation of relationships among network elements of a computer network. Examples of network elements include users, devices, software applications, and data. As represented in a network hologram, the network elements may be referred to as hologram elements (also referred to as security elements or security vectors). A network hologram or related aspects can be used to establish a baseline profile for a network element based on relationships with other network elements. For example, a network hologram can be used to establish a baseline profile for sensitive data and associated devices, software applications, or users that access the sensitive data.

The anomalous movement of data over a computer network can be detected in real-time or near real-time relative to one or more baseline profiles. For example, monitored data that moves in a manner that departs from an expected movement, as indicated by a baseline profile, may suggest suspicious activity. A relationship among hologram elements typically reflects a relationship that exist between network elements. As such, the relationship is inherited from network elements. In some embodiments, a relationship among hologram elements is inherent based on a type of association and/or types of associated hologram elements. For example, any enterprise smartphone and user assigned to that smartphone may have an inherent relationship described in a profile. A profile may reflect the activity among at least two network elements but likely represents several additional network elements to enable accurate detection of an anomalous event. For example, a profile may consider data volumes or file counts in addition to any users, devices, software applications, and/or data or files represented by a network hologram.

Hence, central to the detection of an ongoing data breach is a network hologram that reflects relationships among different hologram elements. For example, a CFO authorized to download any number of financial documents from server-1 may typically download about ten financial documents weekly from the server-1. As such, an anomaly is detected in real-time or near real-time when the CFO downloads 10,000 financial documents from the server-1.

By knowing the relationships among network elements, the rate of false positives is reduced compared to merely knowing the activity related to a single network element. For example, although accessing ten financial files from server-1 by the CFO would be deemed normal, accessing the same ten files from server-1 by an engineer (i.e., different user) could be deemed abnormal for the engineer. Accordingly, instantly knowing who accesses a file improves real-time or near real-time detection. Without the knowledge of these relationships, a security tool would not know whether accessing the ten files is a reportable anomalous event. This example illustrates why a network hologram is central to reliably detecting a security threat by reducing a rate of false positives (e.g., because baseline activity can be described precisely).

In some embodiments, a network hologram is a representation of relationships among four network elements (e.g., users, devices, software applications, data). When a security incident occurs, investigators perform a forensic analysis of the incident to assess the scope of the compromise, identify an entity and/or device responsible for the incident, and locate where the incident occurred. In other words, investigators need to determine what happened (i.e., what data is compromised), who did it, using what device, and from where. A network hologram can be used to address these questions when monitoring activity of a computer network in real-time or near real-time. The monitored activity can be used to mitigate actual or potential security threats such as ongoing data breaches, and identify data breaches that have already occurred.

A network hologram can represent relationships between any number of necessary and sufficient hologram elements. The relationship may be exclusive (i.e., internal) to a group of hologram elements that comprise a network hologram. By using a network hologram, any data carried over a computer network can be traced in real-time or near real-time back to a user and/or the user's device. Information indicative of hologram elements associated with the monitored data can be obtained in unison or near unison from a computer network to detect security threats.

In some embodiments, hologram elements include user, device, software application, and data. A "user" element may refer to a person or entity that can directly or indirectly manipulate data. The "device" element may refer to a device that an individual user can use to manipulate data. The "software application" element may refer to the application handling data sent/received by the user device. The "data" element may refer to data being manipulated (e.g., created, used stored, or moved) on the computer network.

A network hologram provides the basis for detecting abnormal movements of data on a computer network. In some embodiments, a network hologram is built by linking a user with the user's email aliases, devices, software applications, and data in such a way that even when numerous (e.g., hundreds or thousands) of users share the same computer network, an unambiguous relationship persists for any user's email aliases, devices, software applications, and data. In some embodiments, a combination of hologram elements that can form a network hologram are used to a create a detailed baseline profile for each hologram element with respect to monitored data and the whereabouts of that monitored data relative to a computer network. As such, a baseline profile may reflect relationships among hologram elements relative to monitored data.

In some embodiments, a network hologram is used to detect a security threat specifically to sensitive data. As used herein, "sensitive data" may refer to a type of data that an entity seeks to deliberately protect from disclosing to another entity. Most data that is communicated over computer networks is not sensitive data. Examples of sensitive data include personal health information (PHI), personally identifiable information (PII), payment card industry (PCI) data, data related to confidential information, source code, trade secrets of corporations, intellectual property, etc. For example, a corporation can seek to deliberately prevent unauthorized persons from accessing PII of its customers. The PII is sensitive data because it can be used on its own or in combination with other information to identify, contact, or locate an individual independently or in context. Accordingly, a data breach may refer to a security incident in which sensitive, protected, or confidential data is copied, transmitted, viewed, stolen or used by an individual unauthorized to do so.

There are numerous other forms of sensitive data that are not explicitly identified herein but which are well known to persons skilled in the art. Data may be designated as "sensitive" by a government actor (e.g., social security numbers issued by the federal government). Other examples of sensitive data include data designated as such by the entity that owns or manages the data (e.g., design, marketing, or financial documents or files). In other words, sensitive data can be defined based on the desire or actions of proprietors of that data to prevent others from obtaining that data.

In some embodiments, data is deemed sensitive by virtue of its association with a data source. For example, data contained in, obtained from, or moved relative to sources of secured services such as cloud storage, file synchronization, or client software may be deemed sensitive. Examples of such sources include BOX, DROPBOX, or SALESFORCE. For example, a user's baseline behavioral pattern may include downloading PCI data from a SALESFORCE application. The baseline behavioral pattern may not include uploading data to a DROPBOX resource. If the baseline pattern changes because the user uploaded data to the DROPBOX resource, the user's changed behavior could constitute an anomaly indicative of a data breach by virtue of the source of the data.

Figure 2:
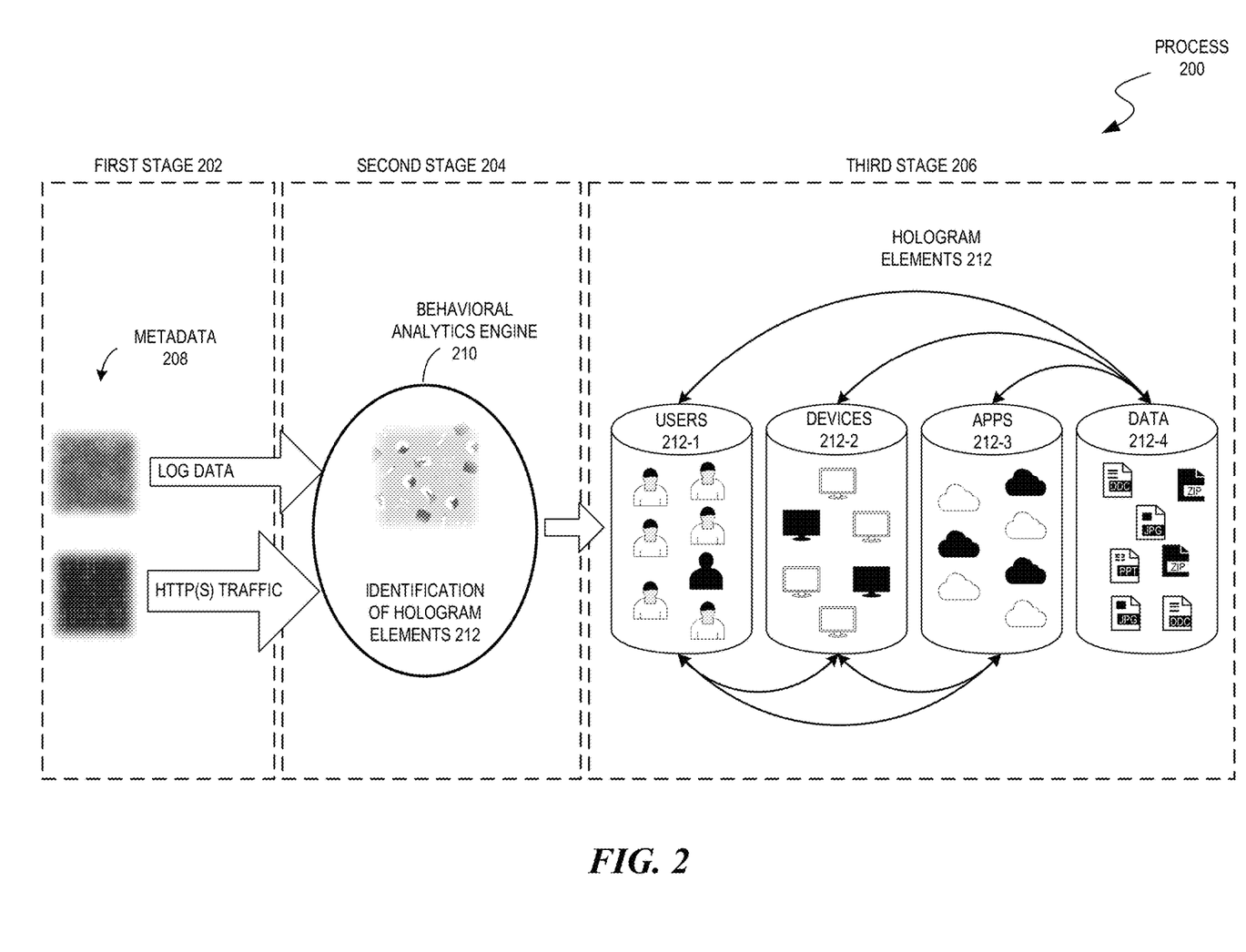
FIG. 2 illustrates stages for creating a network hologram according to some embodiments of the present disclosure.

FIG. 2 illustrates a process for generating a network hologram. As shown, the process 200 includes multiple stages that involve capturing data (e.g., metadata) collected by a behavior analytic engine to generate fully-meshed hologram elements comprised of uniquely identifiable users, devices, software applications, and data (e.g., files). The series of stages begin at collecting data of a computer network and lead to the eventual discovery and building of relationships between users, devices, software applications, and data that can move over a computer network. The hologram elements and their relationships are used to create the network hologram that allows security teams to discover and trace unusual activity on computer networks.

In the first stage 202, metadata 208 is captured from network traffic of interest (e.g., log or HTTP(s) data). The captured metadata 208 can be fed to a behavioral analytics engine 210 along with other metadata of associated network device(s).

In the second stage 204, the behavioral analytics engine 210 processes the collected metadata 208 to identify hologram elements of a network hologram. In the illustrated example, there are four hologram elements that are globally uniquely identifiable: user credentials, user devices, software applications, and data (e.g., files).

In the third stage 206, relationships among the hologram elements 212 are built. As shown, relationships across four hologram elements 212-1 through 212-4 are discovered and maintained by implementing machine-learning techniques. The discovery and building of relationships of the hologram elements 212 allows for real-time or near real-time identification of abnormal behavior associated with data, and enables mitigating security threats by automatically altering network configurations or issuing warnings to a network administrator who can trigger remediation measures.

Suspicious Data in Motion

The ability to detect suspicious movement of data involves establishing a baseline profile for one or more hologram elements of a network hologram. A profile may describe an average or normal behavior of a hologram element relative to one or more measures/dimensions. A variety of aspects may be considered or evaluated to characterize a profile. For example, a profile may indicate an expected location of sensitive data at a point in time. Examples of a profile include a user's normal behavior baseline profile, a device's normal behavior baseline profile, an application's normal behavior baseline profile, or data's normal behavior baseline profile.

A profile for any type of hologram element may include an indication of relationships among hologram elements. Hence, a profile for each of four hologram elements is created relative to its relationship to the other three hologram elements. For example, a profile for a sensitive file can be designed relative to user(s) that have accessed that file, user device(s) through which the file was accessed, and locations from where the file was accessed (e.g., internal servers or cloud-based services).

A profile may also consider a type of sensitive data. That is, sensitive data included in a network hologram can be classified in accordance with one or more data types. For example, sensitive data can be classified as PCI, PII, source code, or confidential data. In some embodiments, a profile for a user or device is linked with sensitive data as well as an indication of the data's classification. By developing a profile that considers both the sensitive data itself as well as a classification of the type of data, the profile of the hologram element is more accurate for subsequent anomaly detection.

As such, the disclosed technology can provide real-time or near real-time detection of an ongoing data breach based on a network hologram including the movement of sensitive data relative to associated users, devices, and/or applications. For example, the behavior of a user associated with a specific type of sensitive data (e.g., financial documents) can be part of the user's profile. A deviation between a baseline user behavior and the actual user behavior relative to the financial documents may be detected as a potential anomaly.

Figure 3:
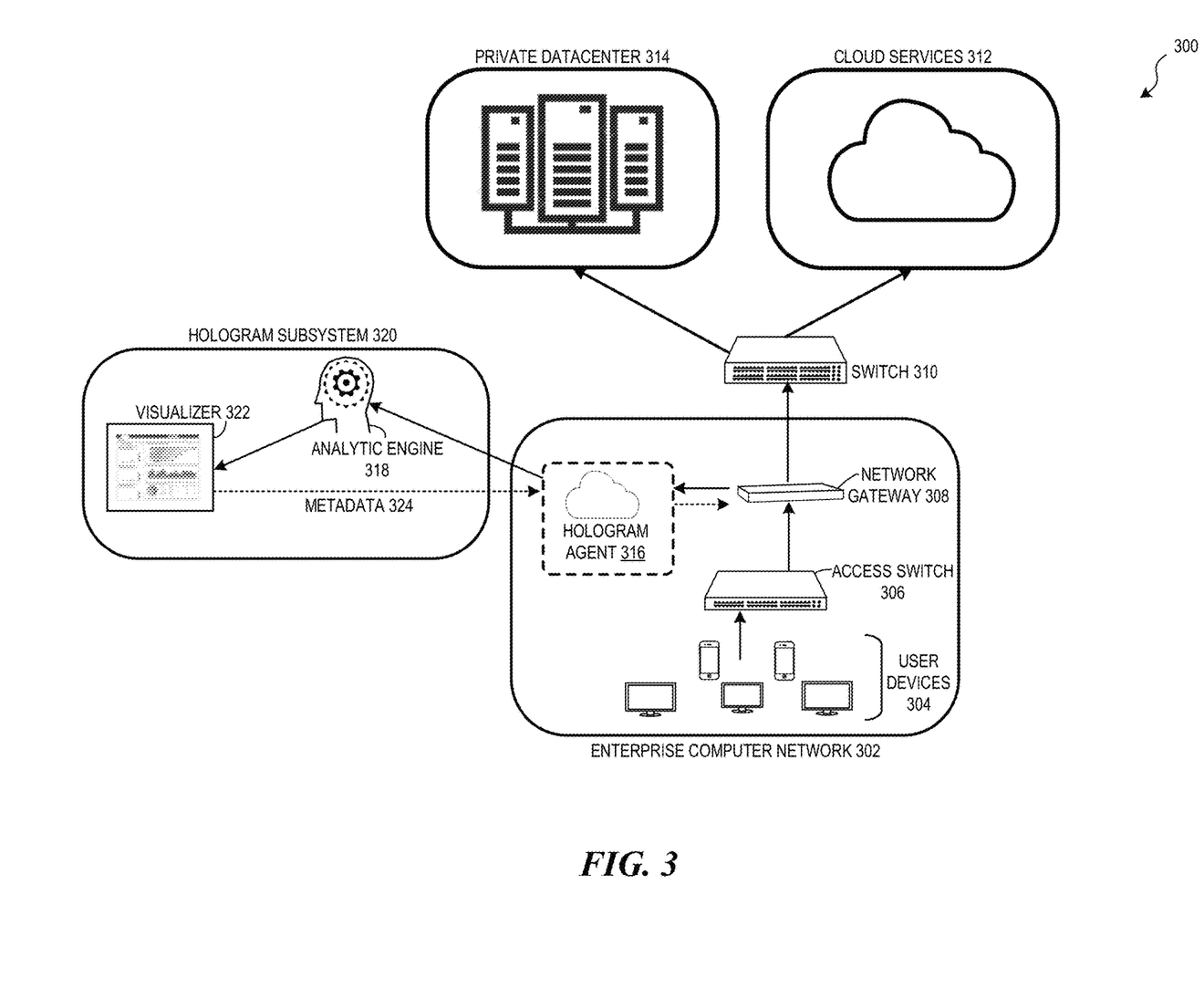
FIG. 3 is a block diagram that illustrates an example of a system for real-time or near real-time anomaly detection according to some embodiments of the present disclosure.

FIG. 3 is a block diagram that illustrates an example of a system for real-time or near real-time anomaly detection according to some embodiments of the present disclosure. The system 300 includes an enterprise computer network 302 that has user devices 304 coupled to an access switch 306 coupled to a network gateway 308 (e.g., layer 3 switch, router, or firewall), which couples the enterprise computer network 302 to another switch 310 coupled to cloud services 312 and/or a private datacenter 314. The cloud services 312 may include resources that are accessible over the Internet by users of the enterprise computer network 302. The private datacenter 314 also includes resources that are accessible by users of the enterprise computer network 302.

The illustrated embodiment includes a hologram agent 316. In some embodiments, the hologram agent 316 is a network sensor. In some embodiments, the hologram agent 316 includes software running on a virtual machine executing on a device of the enterprise computer network 302 that acts as a sensor to monitor the enterprise computer network 302. In some embodiments, the hologram agent 316 collects network traffic traversing the enterprise computer network 302, and captures or generates metadata such as user credentials, file names, session information, and sends the collected data to an analytic engine 318 in the hologram subsystem 320. The analytic engine 318 of the hologram subsystem 320 can build a network hologram and profile hologram elements based on the data obtained from the hologram agent 316 residing on the enterprise computer network 302. Further, the analytic engine 318 of the hologram subsystem 320 can monitor network activity in real-time or near real-time to identify suspicious behavior such as anomalous movement of sensitive data from a user device 304 to the cloud services 312 or applications hosted in private data center 314 that is indicative of a data breach.

In some embodiments, the hologram subsystem 320 includes a visualizer tool 322 used to visualize the monitoring performed by the analytic engine 318. For example, a user interface can be rendered on a computer accessible by an analyst monitoring the enterprise computer network 302 for suspicious activity related to sensitive data. The visualizer tool 322 may create graphs indicating anomalous activity, alerts of threats, and/or suggest adequate remediation measures. In some embodiments, the visualizer tool 322 can send metadata 324 back to the enterprise computer network 302 for its own use in performing an analysis of the enterprise computer network 302.

Figure 4:
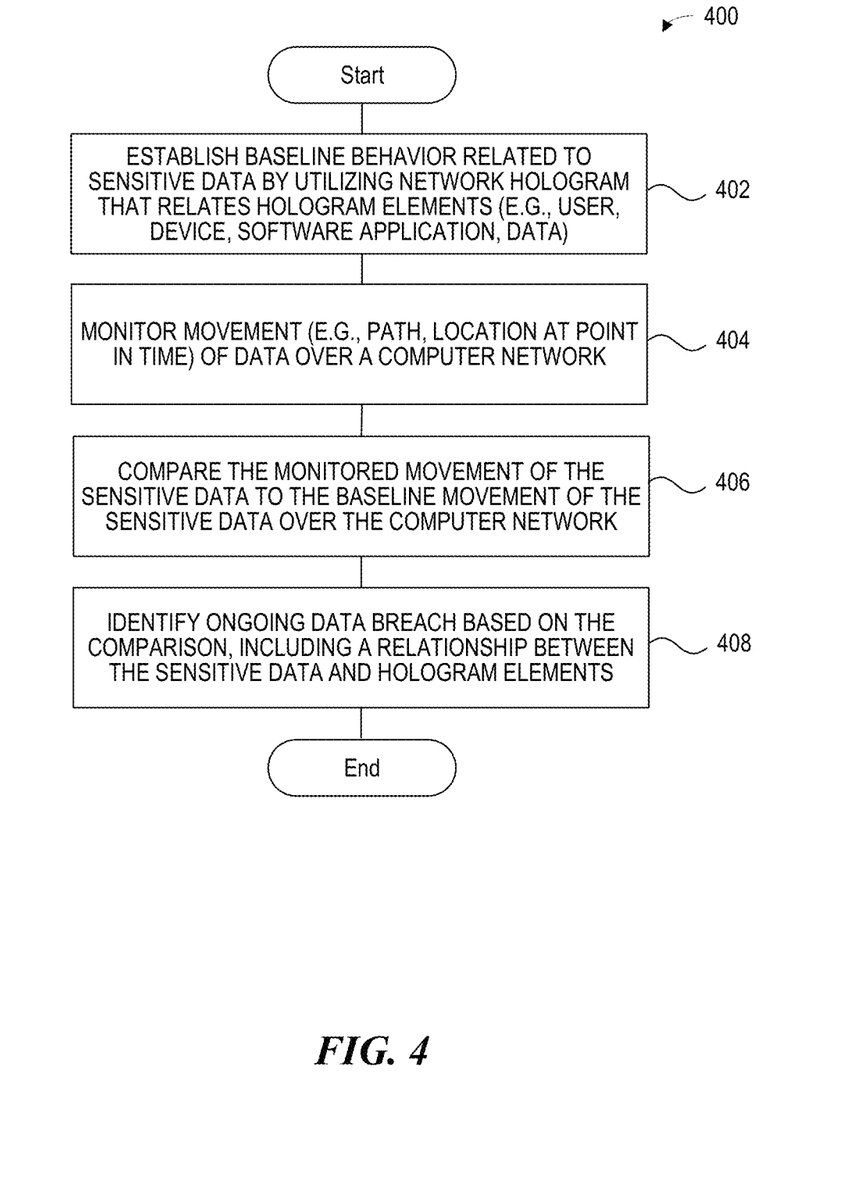
FIG. 4 illustrates a process 400 for detecting an ongoing data breach in a computer network according to some embodiments of the present disclosure.

FIG. 4 illustrates a process 400 for detecting an ongoing data breach in a computer network according to some embodiments of the present disclosure. The process 400 can be practiced by one or more computing devices that monitor the activity of data that moves over a computer network. For example, the computing device(s) can be communicatively coupled to a private network being monitored for any suspected data breaches. Unlike prior systems that could only detect a data breach long after the breach has occurred, the process 400 can detect an ongoing data breach (e.g., in real-time or near real-time).

The process 400 can detect an ongoing data breach because it uses a network hologram to identify and track the movement of sensitive data relative to any number of users, devices, applications, and/or any combination of hologram elements. If the movement of the data deviates substantially enough from the expected movement of the data, a network administrator can be alerted to a suspected data breach. Further, the use of the network hologram can allow the network administrator to identify the user, device, software application, or another hologram element involved in the data breach because the relationships among these hologram elements are represented in the network hologram.

In step 402, one or more baseline profiles are generated for one or more hologram elements of the computer network. A profile describes an expected activity of a hologram element relative to one or more other hologram elements. For example, a profile of a device describes expected activity of that device relative to at least one of a user, application, data, and/or any other hologram element. In some embodiments, a profile is generated for each hologram element or a group of hologram elements.

For example, a profile can be generated for each of four hologram elements (e.g., user, device, application, data) that each represents an expected behavior of that hologram element and any relationship with the other three hologram elements. For example, the profile of sensitive data can indicate which user(s) have accessed that sensitive data, any device(s) used by the user(s) to access the sensitive data, geographic locations from where the sensitive data is accessed (e.g., local or cloud services), etc. Hence, combinations of hologram elements can be used to create a profile for each device and/or each user relative to the whereabouts of the sensitive data.

The relationships among hologram elements that are profiled can be derived from a network hologram. As indicated above, the network hologram is generated to represent relationships between at least two network elements of a computer network. For example, a network hologram can represent a relationship between any number of users, devices, software applications, and/or data associated with a computer network. A network hologram can be maintained in a memory of computing devices communicatively coupled to the computer network and used to monitor the movement of data by building profiles for hologram elements and then detecting suspicious deviations from expected movements of data relative to the hologram elements.

In some embodiments, a profile is generated by collecting data of a network element over a range of time. The collected data can be processed (e.g., synthesized, aggregated) in accordance with techniques used to generate the profile that includes relationships between hologram elements of a network hologram. Examples of these techniques include machine learning, behavior modeling, peer group analysis, classification, statistical models, etc. Once generated, a profile can be used as a reference to compare and/or contrast ongoing activities of the profiled hologram element, to detect an anomaly related to a breach of sensitive data.

In step 404, movement of sensitive data over a computer network is monitored in real-time or near real-time. For example, data can be identified as sensitive data and tracked as it traverses a path from a source device to a destination device (e.g., a server) over one or more computer networks. In another example, the whereabouts of sensitive data can be detected at one or more points in time. The whereabouts can include a device, geographic location, software application, etc. The monitored movement of sensitive data can be compared against one or more profiles of hologram elements. For example, sensitive data can be located at a local storage at a first point in time and located at a cloud storage at a second point in time.

The disclosed system can monitor movement of any type of data, which is not necessarily sensitive data. However, detecting a breach of non-sensitive data may be of less interest to a network administrator because broadly monitoring all data types is resource intensive due to the volume of data that regularly moves over typical computer networks. Accordingly, monitoring only sensitive data improves the efficiency of detecting data breaches in real-time or near real-time by reducing the burden on computing resources to monitor only a subset of all the data communicated over a computer network.

The disclosed system can discern between degrees of sensitivity that constitute different types of sensitive data. That is, data can be associated with a degree of sensitivity. For example, sensitive data can be classified by type such as PCI, PII, source code, confidential data, or customer-defined (i.e., specified by customers). When a hologram element is profiled, the hologram element can be linked not only to specific data that it handles but also the data type such that anomaly detection is more accurate because it is based on a profile that discerns between different types of sensitive data.

In step 406, the system can compare the monitored movement of data to the expected baseline movement of the data over the computer network. For example, the monitored data can be compared against the expected location (e.g., local storage) of that sensitive data. In another example, the path taken by the movement of sensitive data (e.g., between two local devices) can be compared against the expected path taken by sensitive data (e.g., between local and cloud devices). In some embodiments, the comparison between the actual and expected movement of data may include characteristics of that data such as information indicative of when data is created, modified, or any other metadata associated with the sensitive data or its whereabouts.

A profile can be retrieved for monitored data that is identified as data of interest (e.g., sensitive data). The monitored movement of the sensitive data can be compared against the expected movement of sensitive data described in the retrieved profile. That is, the monitored movement of the sensitive data is compared against its profiled movement. The difference(s) between the monitored activity and expected activity as described in the profile is used to determine whether the activity is anomalous. For example, sensitive data that moves over a computer network in a manner that substantially deviates from an expected movement could be deemed anomalous, whereas relatively trivial differences may be deemed normal. The amount of any difference between actual activity and expected activity of data that is used to discern between anomalous and normal activity can be a threshold amount. The threshold may be pre-selected or user-defined. The differences defined in a threshold can be measured along different dimensions such as network location/paths and points in time.

In step 408, the system can identify an ongoing data breach based on the comparison including the relationship between the sensitive data and other hologram elements. Likewise, other hologram elements related to the sensitive data can be identified based on the network hologram. For example, at least one of a user, device, or software application associated with anomalous activity of sensitive data can be identified from the network hologram. As such, detection of sensitive data that is accessed in an unusual manner can be used to determine characteristics of an ongoing data breach such as the user, device, software application, or other data associated with the data breach.

Example Compromise of a Computer Network

To better understand how the disclosed technology can detect data breaches of a computer network, and what distinguishes it from existing solutions, consider an example in which a CFO's laptop computer has been compromised by a hacker. The laptop computer belongs to a computer network of the CFO's company. The hacker can use the laptop computer to steal confidential data files maintained by the company's computer network.

The disclosed solution will have profiled the CFO's laptop computer. Specifically, through a built-in content inspection engine, the disclosed solution can identify types of sensitive files that the CFO typically causes to move on the computer network, and the computing resources from where the data is moved and/or to where the data is moved. For example, the disclosed solution could identify confidential financial statements or any other sensitive data moved from the company servers.

The disclosed technology can monitor and link any sensitive data movements normally caused by the CFO with the CFO's laptop computer in real-time or near real-time, and profile that behavior accordingly. After a period of machine learning that uses the collected data as training data, a profile describing a baseline pattern is built for the CFO's movement of sensitive data using the CFO's laptop computer.

When the hacker breaches the CFO's laptop computer, the hacker may attempt to access source code (i.e., a type of sensitive data) stored in a server that is completely different from the servers commonly accessed with the CFO's laptop computer. Accordingly, accessing the source code is uncommon for the CFO, as well as accessing the server on which the source code is stored. Therefore, the monitored activity clearly departs from the CFO's normal patterns. As such, the disclosed technology can instantly detect the abnormal movement of the source code and issue alerts to, for example, the CFO and the security team.

Therefore, the disclosed technology can complement an existing security infrastructure to provide a top-down, holistic view showing how sensitive data moves across a computer network, from end-point devices to servers anywhere, either internally or externally via the Internet. This solution serves as a complement to both end-point security solutions and existing network-based security solutions. Specifically, current end-point solutions provide a detailed and comprehensive view of everything happening at a device level, but cannot capture a complete picture of how individual end-points are connected to each other and communicate throughout the networks. The disclosed top-down view across all devices and servers adds an extra dimension of visibility to existing end-point solutions. In particular, the disclosed technology can track movement of data to or from an end-point device without the need to install an agent on the device.

In contrast, network-based solutions may detect anomalous patterns among all data traffic, but have no way of discerning anomalous movement of sensitive data that is indicative of a data breach. To better understand how the disclosed technology can detect data breaches, consider analogizing data traffic to car traffic where sensitive data is "gold" being transported by cars on a highway. Any car's driving pattern may change regardless of whether it is carrying gold. If a security system is simply identifying changes in driver behavior, it will lead to too many false positives of an actual threat. However, by identifying which cars are carrying gold, identifying the drivers, and identifying the destination of the cars, the solution effectively eliminates false positives resulting from the mere detection of changes in driving behavior.

Therefore, perimeter defenses, network-based breach detection, and end-point security are all essential components of a solid security infrastructure. However, they are insufficient to protect the sensitive data that thieves are commonly after. If an intruder manages to elude these security measures (the literal definition of a breach), then sensitive data is at risk. To reliably pinpoint and thwart data breaches, entities need a last line of defense to complement their existing security infrastructure. With the disclosed technology, the would-be thief is identified, betrayed by the data itself as soon as it starts to move in a manner that meaningfully differs from its normal user, device, and/or application patterns. Therefore, in today's more open, virtualized computing environments, the disclosed technology enables entities to collaborate and share sensitive data with far less fear of compromise.

Computing System

Figure 5:
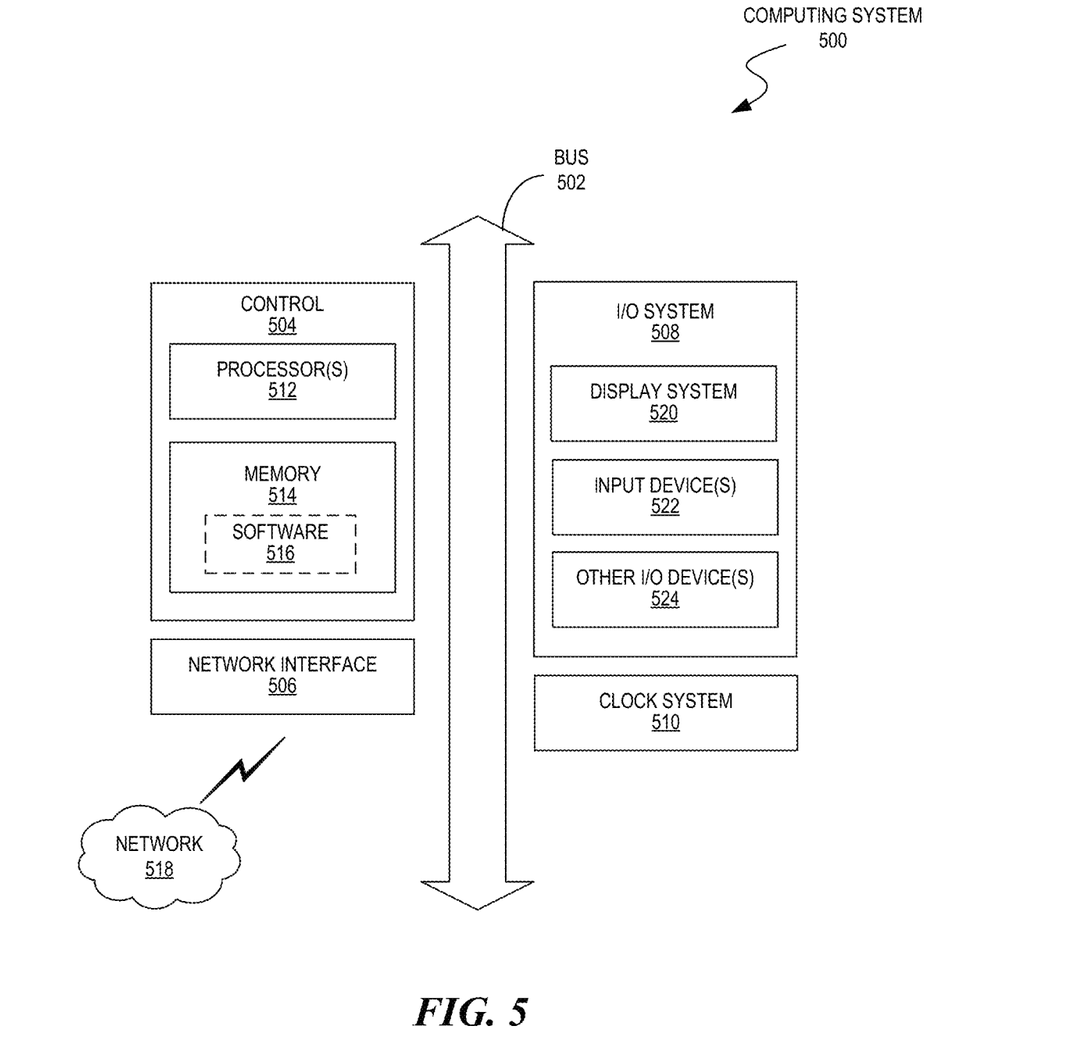
FIG. 5 is a block diagram of a computing system operable to implement the disclosed technology according to some embodiments of the present disclosure.

FIG. 5 is a block diagram of a computing system 500 operable to implement the disclosed technology according to some embodiments of the present disclosure. Examples include components of the cloud-based services 102, client devices 106, or service provider servers 104. The computing system 500 may be a general computer or a device specifically designed to carry out features of the disclosed technology. The computing system 500 may be a network device, a system-on-chip (SoC), a single-board computer (SBC) system, a desktop or a laptop computer, a kiosk, a mainframe, a mesh of computer systems, a handheld mobile device, or combinations thereof.

The computing system 500 may be a standalone device or part of a distributed system that spans multiple networks, locations, machines, or combinations thereof. In some embodiments, the computing system 500 operates as a server computer (e.g., a network server computer running an analytic engine) or a mobile device (e.g., a user device of an enterprise network) in a networked environment, or a peer machine in a peer-to-peer system. In some embodiments, the computing system 500 may perform one or more steps of the disclosed embodiments in real-time, near-real time, offline, by batch processing, or combinations thereof.

As shown, the computing system 500 includes a bus 502 operable to transfer data between hardware components. These components include a control 504 (i.e., processing system), a network interface 506, an Input/Output (I/O) system 508, and a clock system 510. The computing system 500 may include other components not shown, nor further discussed for the sake of brevity. One having ordinary skill in the art will understand any hardware and software included but not shown in FIG. 5.

The control 504 includes one or more processors 512 (e.g., central processing units (CPUs), application-specific integrated circuits (ASICs), and/or field-programmable gate arrays (FPGAs)) and memory 514 (which may include software 516). The memory 514 may include, for example, volatile memory such as random-access memory (RAM) and/or non-volatile memory such as read-only memory (ROM). The memory 514 can be local, remote, or distributed.

A software program (e.g., software 516), when referred to as "implemented in a computer-readable storage medium," includes computer-readable instructions stored in a memory (e.g., memory 514). A processor (e.g., processor 512) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows, Linux) or a specific software application, component, program, object, module, or sequence of instructions referred to as "computer programs."

As such, the computer programs typically comprise one or more instructions set at various times in various memory devices of a computer (e.g., computing system 500) and which, when read and executed by at least one processor (e.g., processor 512), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 514).

The network interface 506 may include a modem or other interfaces (not shown) for coupling the computing system 500 to other computers over the network 518. The I/O system 508 may operate to control various I/O devices, including peripheral devices such as a display system 520 (e.g., a monitor or touch-sensitive display) and one or more input devices 522 (e.g., a keyboard and/or pointing device). Other I/O devices 524 may include, for example, a disk drive, printer, scanner, or the like. Lastly, the clock system 510 controls a timer for use by the disclosed embodiments.

Operation of a memory device (e.g., memory 514), such as a change in state from a binary one to a binary zero (or vice versa), may comprise a perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electric or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms, and that the disclosure applies equally regardless of the particular type of machine or computer-readable media used to actually effect the distribution.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A computer-implemented method for identifying a data breach, the method comprising:
   establishing a baseline pattern of movement of data including an expected user that accesses the data, an expected device used by the expected user to access the data, and an expected path traversed by the data,
      wherein the expected path includes an expected geographic location from where the data is accessed, an expected cloud storage, and an expected software application for the data at respective points in time;
   monitoring a pattern of movement of data over a computer network in real-time or near real-time relative to a user that accesses the data, a device used to access the data, and an actual path traversed by the data,
      wherein the actual path includes a geographic location from where the data is accessed, a cloud storage, and a software application for the data at respective points in time, and
      wherein the user directly or indirectly manipulates the data, the device is operable to manipulate the data, and the software application handles sending or receiving the data relative to a computing device;
   comparing the monitored pattern of movement of the data to the baseline pattern of movement of the data in real-time or near real-time relative to the user, the device, and the actual path;
   detecting an anomalous movement of the data that differs from an expected movement of the data based on the baseline pattern of movement,
      wherein the anomalous movement of the data includes a deviation from the expected geographic location from where the data is accessed, the expected cloud storage, or the expected software application for the data at the respective points in time; and
   identifying an ongoing data breach in real-time or near real-time based on a relationship among the data, the user, the device, and the anomalous movement.

2. The method of claim 1, wherein
   the comparison is between the actual path taken by the data and the expected path of the data over the computer network.

3. The method of claim 2, wherein the actual path is between a first plurality of computing devices coupled to one or more computer networks, and the expected path is between a second plurality of computing devices different from the first plurality of computing devices.

4. The method of claim 2, wherein the actual path is within the computer network, and the expected path includes a cloud resource external to the computer network.

5. The method of claim 1, wherein monitoring the pattern of movement of data over the computer network comprises:
   ascertaining a characteristic of the data at a point in time such that the comparison is between the characteristic of the data at the point in time and a baseline characteristic of the data at the point in time.

6. The method of claim 5, wherein the characteristic is a location of the data on the computer network.

7. The method of claim 1, wherein identifying the ongoing data breach comprises:
   identifying a deviation of the data, the user, or the device relative to the expected path.

8. The method of claim 1, wherein identifying the ongoing data breach comprises:
   identifying a relationship between the data and a physical location of the ongoing data breach.

9. The method of claim 1, wherein the data is sensitive data that is a type of data that an entity seeks to deliberately protect from disclosing to another entity.

10. The method of claim 9, wherein the sensitive data comprises at least one of:
    personal health information;
    personally identifiable information;
    payment card industry data;
    confidential information;
    design document;
    trade secret;
    source code; or
    customer-defined information.

11. The method of claim 1, wherein the data breach is sensitive, protected, or confidential data that is copied, transmitted, viewed, stolen, or used by an individual unauthorized to do so.

12. The method of claim 1, wherein comparing the monitored pattern of movement of the data to the baseline movement of the data is relative to each of the user, the device, or the software application.

13. A computer-implemented method for identifying a data breach, the method comprising:
    establishing a baseline pattern of behavior of data including an expected user that accesses the data, an expected device used by the expected user to access the data, and an expected path traversed by the data,
       wherein the expected path includes an expected geographic location from where the data is accessed, an expected cloud storage, and an expected software application for the data at respective points in time;
    monitoring behavior of data on a computer network in real-time or near real-time relative to a user that accesses the data, a device used to access the data, and a path traversed by the data,
       wherein the path includes a geographic location from where the data is accessed, a cloud storage, and a software application for the data at respective points in time, and
       wherein the user directly or indirectly manipulates the data, the device is operable to manipulate the data, and the software application handles sending or receiving the data relative to a computing device;
    comparing the monitored behavior of the data to the baseline behavior of the data in real-time or near real-time relative to the user, the device, and the path;
    detecting an anomalous behavior of the data that differs from an expected behavior of the data as indicated based on the baseline behavior,
       wherein the anomalous behavior of the data includes a deviation from the expected geographic location from where the data is accessed, the expected cloud storage, or the expected software application at the respective points in time; and
    identifying an ongoing data breach in real-time or near real-time based on a relationship among the data, the user, the device, and the anomalous behavior.

14. The computer system of claim 13, wherein the expected behavior is described in a profile of a user, device, software application, or data.

\* \* \* \* \*